US009934469B1

(12) United States Patent
Jau et al.

(10) Patent No.: US 9,934,469 B1
(45) Date of Patent: Apr. 3, 2018

(54) METHOD AND APPARATUS FOR QUANTUM INFORMATION PROCESSING USING ENTANGLED NEUTRAL-ATOM QUBITS

(71) Applicants: National Technology & Engineering Solutions of Sandia, LLC, Albuquerque, NM (US); STC.UNM, Albuquerque, NM (US)

(72) Inventors: Yuan Yu Jau, Albuquerque, NM (US); Grant Biedermann, Albuquerque, NM (US); Ivan Deutsch, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/370,224

(22) Filed: Dec. 6, 2016

Related U.S. Application Data

(60) Provisional application No. 62/265,579, filed on Dec. 10, 2015.

(51) Int. Cl.
*G06N 99/00* (2010.01)

(52) U.S. Cl.
CPC .................................. *G06N 99/002* (2013.01)

(58) Field of Classification Search
CPC . G02F 3/00; H03K 3/42; H03K 19/14; G11C 13/04; G06N 99/002
See application file for complete search history.

(56) References Cited

PUBLICATIONS

Saffman, M. 2016. Quantum computing with atomic qubits and rydberg interactions: Progress and challenges. Journal of Physics B: Atomic, Molecular and Optical Physics 49, (20) (Oct. 28): 202001 (24 pp.), https://dialog.proquest.com/professional/docview/1827958441?accountid=142257 (accessed Jan. 6, 2018).*
Xiao-Feng Shi. 2017. Rydberg quantum gates free from blockade error. Physical Review Applied 7, (6) (Jun. 1): 064017 (16 pp.), https://dialog.proquest.com/professional/docview/1912648010?accountid=142257 (accessed Jan. 6, 2018).*
G. Biedermann, et al. , Adiabatic quantum computation with Rydberg-dressed atoms, SAND2013-0191J, Sandia National Laboratories (2013).
G. Biedermann et al., Quantum information processing with Rydberg-dressed atoms, SAND2013-1385C, Sandia National Laboratories (2013).

(Continued)

*Primary Examiner* — Jennifer D. Carruth
(74) *Attorney, Agent, or Firm* — Martin I. Finston

(57) ABSTRACT

A method for preparing an entangled quantum state of an atomic ensemble is provided. The method includes loading each atom of the atomic ensemble into a respective optical trap; placing each atom of the atomic ensemble into a same first atomic quantum state by impingement of pump radiation; approaching the atoms of the atomic ensemble to within a dipole-dipole interaction length of each other; Rydberg-dressing the atomic ensemble; during the Rydberg-dressing operation, exciting the atomic ensemble with a Raman pulse tuned to stimulate a ground-state hyperfine transition from the first atomic quantum state to a second atomic quantum state; and separating the atoms of the atomic ensemble by more than a dipole-dipole interaction length.

10 Claims, 8 Drawing Sheets

(56) References Cited

PUBLICATIONS

G. Biedermann et al., Adiabatic quantum computing with dressed Rydberg atoms , SAND2011-4006C, Sandia National Laboratories (2013).
A. M. Hankin et al., Two-atom Rydberg blockade using direct 6S to nP excitation, Physical Review A 89, 033416 (2014).
Y.-Y. Jau et al., "Entangling atomic spins with a Rydberg-dressed spin-flip blockade," Nature Physics 12, 71-74 (2016), Published online Oct. 5, 2015.
Y.-Y. Jau et al., "Entangling atomic spins with a Rydberg-dressed spin-flip blockade," Nature Physics 12, 71-74 (2016), Published online Oct. 5, 2015, Supplementary Information, Published online at http://www.nature.com/nphys/journal/v12/n1/extref/nphys3487-s1.pdf.

* cited by examiner

METHOD AND APPARATUS FOR QUANTUM INFORMATION PROCESSING USING ENTANGLED NEUTRAL-ATOM QUBITS

CROSS-REFERENCE TO RELATED APPLICATION

This application claims the benefit of U.S. Provisional Application No. 62/265,579, filed Dec. 10, 2015, the entirety of which is hereby incorporated herein by reference.

FEDERALLY SPONSORED RESEARCH

The United States Government has rights in this invention pursuant to Department of Energy Contract No. DE-AC04-94AL85000 with Sandia Corporation.

FIELD OF THE INVENTION

The invention relates to methods and systems of quantum information processing, and more particularly to those methods and systems that create and utilize entangled quantum states.

ART BACKGROUND

Although the technology for quantum information processing is still at an early stage, numerous applications for such technology have been envisaged and investigated theoretically and experimentally. Quantum computing is one of the most important applications. Applications have also been proposed in the fields of cryptography, communication, and navigation, among others.

A variety of different physical devices have been proposed as host environments for quantum information processing. A common characteristic of these environments is that they can support qubits or similar quantum mechanical systems, and that the qubit (or the like) has a coherence time that is long enough to permit quantum computations to take place.

A qubit is a physical system that has two quantum mechanical states, and that can exist in a superposition of those two states. The possibility of superposition of states is an essential feature of quantum information processing. The two states of a qubit are often represented in Dirac notation by the symbols $|0>$ and $|1>$, respectively.

Another important feature in many aspects of quantum information processing is entanglement. Two particles are said to be entangled if the quantum state of one cannot be described without reference to the other. Stated more formally, a system is entangled if its quantum state cannot be factored as a product of the individual states of its constituent particles. As a consequence of entanglement, the outcome of an experiment that collapses the quantum state of a first particle to produce an observable measurement can be correlated with the outcome of a similar experiment performed on a second particle that is entangled with the first, even if at the time of measurement the particles are separated by a macroscopic distance that precludes mutual interaction.

Researchers have considered numerous quantum mechanical systems in their quest for two-state systems that would be promising as qubits for quantum information processing. Among the more promising systems are neutral atoms that have conveniently spaced hyperfine levels. The hyperfine structure of an atom is the splitting of the energy of an electronic orbital into multiple levels due to electrical and magnetic interactions between the electron and the atomic nucleus. In some atoms, there are hyperfine splittings that provide pairs of energy levels suitable for use as a qubit.

The hyperfine splitting can also be utilized to prepare ensembles of entangled atoms. The ensembles may consist of pairs of atoms, or of groups of three or even more atoms. In an idealized example, each of a pair of atoms are initially prepared in the individual state $|1>$, so that the joint state is the separable (hence not entangled) state $$|11>=|1>\otimes|1>. \quad (1)$$

An appropriate excitation then excites one (unidentifiable) member of the pair, to produce the entangled state $$(1/\sqrt{2})\cdot(|01>+|10>). \quad (2)$$

Further excitation can produce, e.g., the entangled state $$(1/\sqrt{2})\cdot(|00>+|11>). \quad (3)$$

A phenomenon referred to as Rydberg blockade has been utilized to prepare pairs of atoms in entangled states such as the state described by Equation (2). Atoms that are excited to very high principal quantum numbers n are referred to as Rydberg atoms. Rydberg atoms exhibit a strong mutual electric dipole-dipole interaction (EDDI). One consequence of the EDDI is that when an appropriately tuned optical pulse excites a first atom to a Rydberg state, the EDDI can detune a second atom situated within a dipole interaction distance from the excitatory pulse, so that the second atom remains behind in the initial state. Subsequent evolution of the two-atom system over one pathway for the Rydberg atom and a different pathway for the non-Rydberg atom (of course the two atoms must be indistinguishable) can lead to the entangled state.

Although the Rydberg blockade method has produced interesting results, alternatives have been sought, not least because it is difficult to maintain the required phase coherence between the highly excited Rydberg atoms and the atoms in the initial state.

One proposed alternative is to utilize so-called Rydberg-dressed interactions in place of the Rydberg blockaded interactions described above. In a Rydberg-dressed interaction, a small amount of Rydberg character is admixed into the atomic ground state to produce a Rydberg-dressed atom. The Rydberg-dressed atom still exhibits EDDI which has the desired effect of producing a two-atom system that can evolve into an entangled state. However, phase control is more robust because phase coherence now only need be maintained between ground-state atomic levels, which are far less sensitive to thermal fluctuations that affect the optical phase.

Although there are theoretical benefits to the use of Rydberg-dressed interactions, experimental demonstration has been elusive. Hence there remains a need for a new, practical approach that can reliably produce entangled pairs of neutral atoms using Rydberg-dressed blockade.

SUMMARY OF THE INVENTION

We have found such an approach. In our approach, each qubit is encoded inside the hyperfine sublevels of an atom, as explained above. By impinging a beam from, e.g., an off-resonance Rydberg excitation laser onto the atoms, which have been placed at sufficiently short inter-atomic distances, we can produce the interactions between ground-state atoms that cause some transitions between the states of multiple-qubit basis to be blockaded. This leads to an efficient way to generate entangled states by simply turning on a qubit transition pulse. The system then naturally evolves into the desired entangled state.

In the preceding expression, the symbol "Ω" stands for the optical Rabi frequency of the Rydberg laser, i.e., the Rabi oscillation frequency between the |0> and |r> states.

The right-hand side of the figure, titled "With Rydberg blockade," indicates that because of the Rydberg blockade, the light shift on state $|00\rangle$ takes on the modified value $$\Delta\nu_{BLS} = -\frac{\Delta}{2}\left(\sqrt{1+\frac{2\Omega^2}{\Delta^2}}-1\right),$$

where the two-qubit interaction strength is given by $\Delta\nu_{BLS}-\Delta\nu_{LS}=J$.

Figure 2:
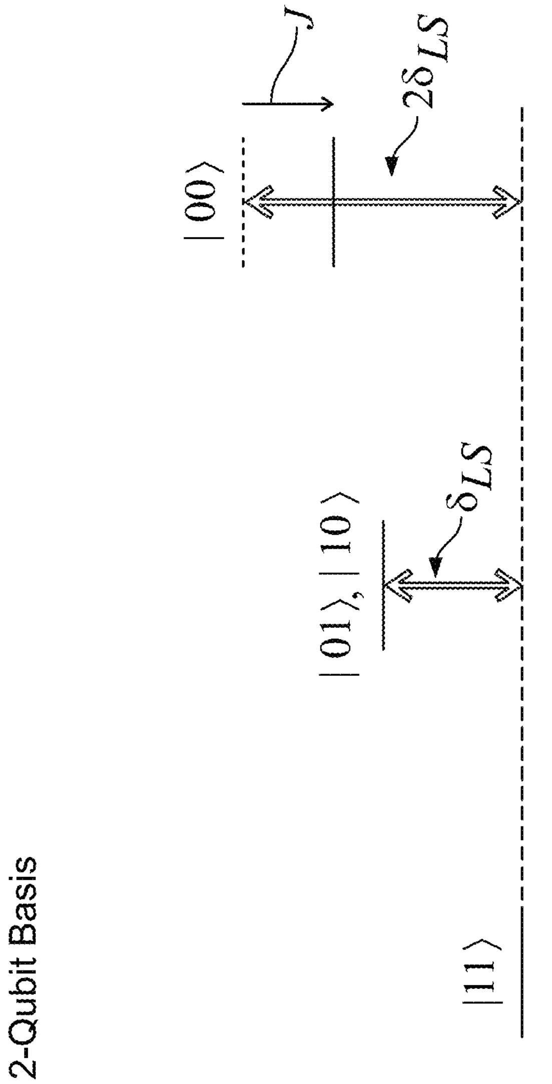

FIG. 2 is a notional atomic energy-level diagram illustrating the relative energies of two-qubit basis states as modified by the two-qubit interaction strength J due to Rydberg laser dressing.

Figure 3:
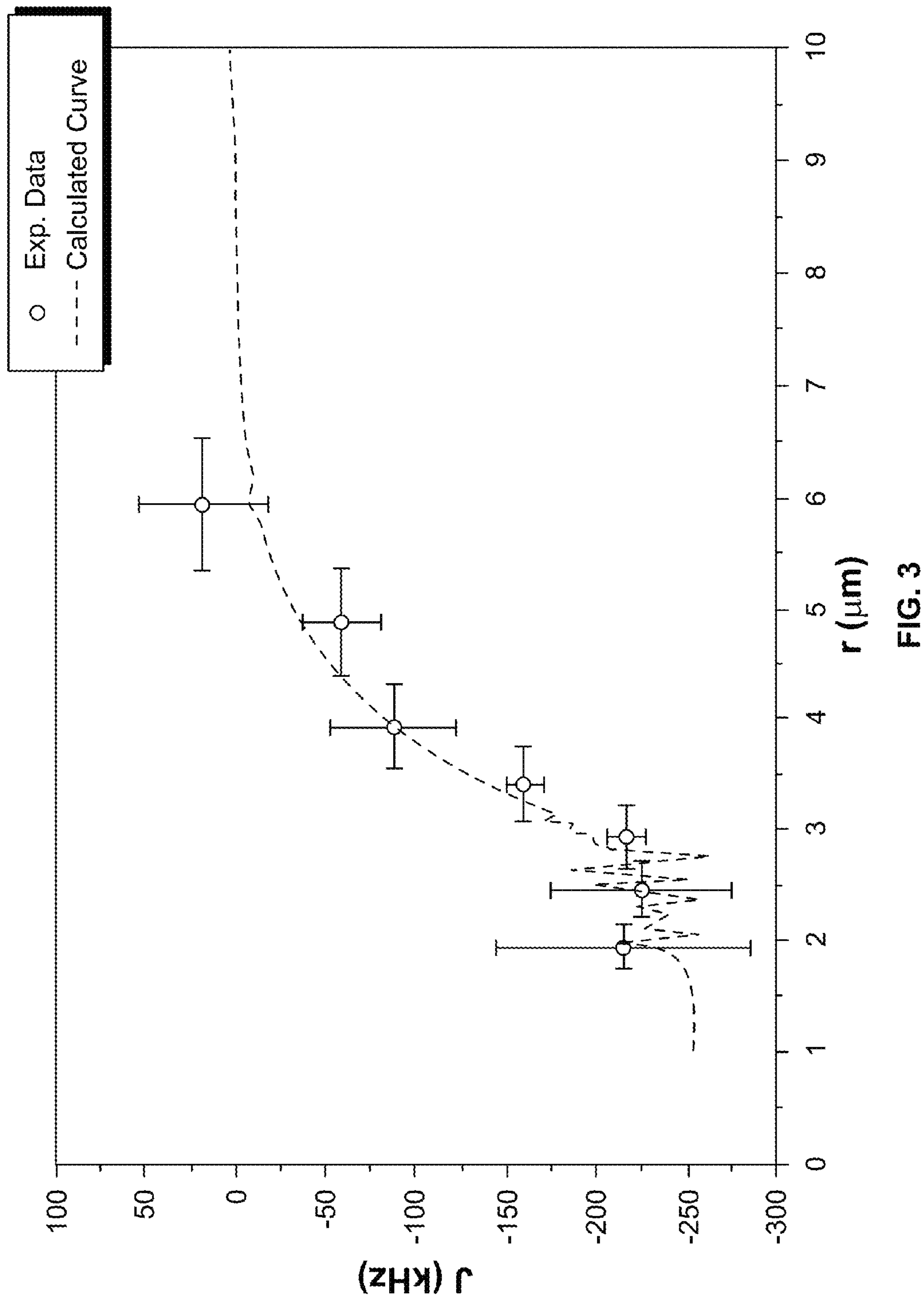

FIG. 3 provides a graph of the two-qubit interaction strength J as a function of interatomic separation r, i.e., the separation between two trapped cesium-133 atoms as described below. The scale on the vertical axis is marked off in frequency units which represent the equivalent energy according to the relation energy=frequency×h, h being Planck's constant.

Figure 4:
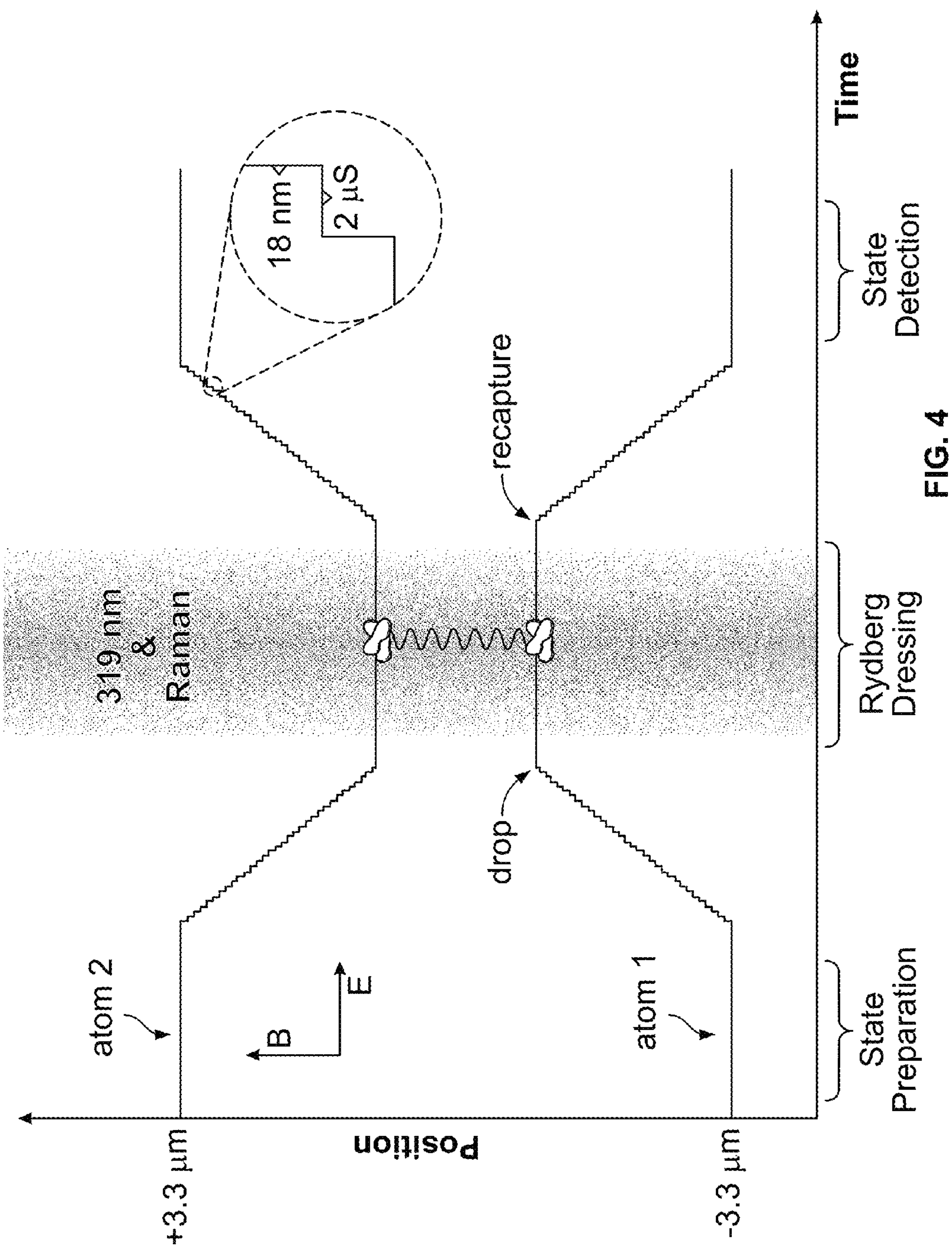

FIG. 4 illustrates an example experimental sequence for achieving entanglement according to the principles described here.

Figure 5:
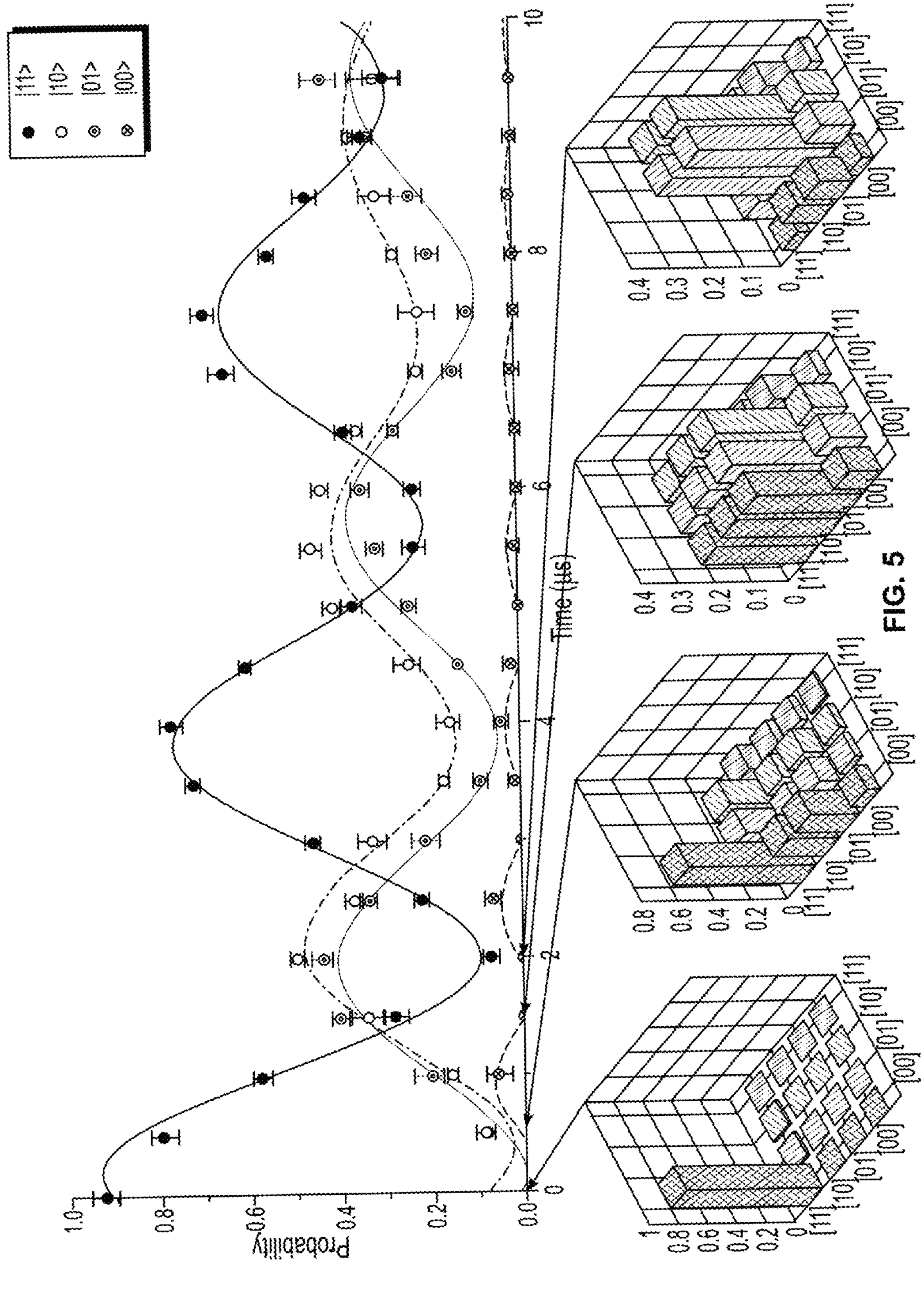

FIG. 5 provides, in the main view, a graph of experimental results showing system evolution under conditions of Rydberg-dressed blockade. The two-qubit state probability is plotted versus the duration (in microseconds) of the Raman pulse that excites the transition between the $|0\rangle$ and $|1\rangle$ single-atom qubit states. The four insets illustrate the evolution of the two-qubit density matrix. The respective density matrices represent the system at Raman pulse durations of zero and approximately 0.6, 1.4, and 2 microseconds.

Figure 6:
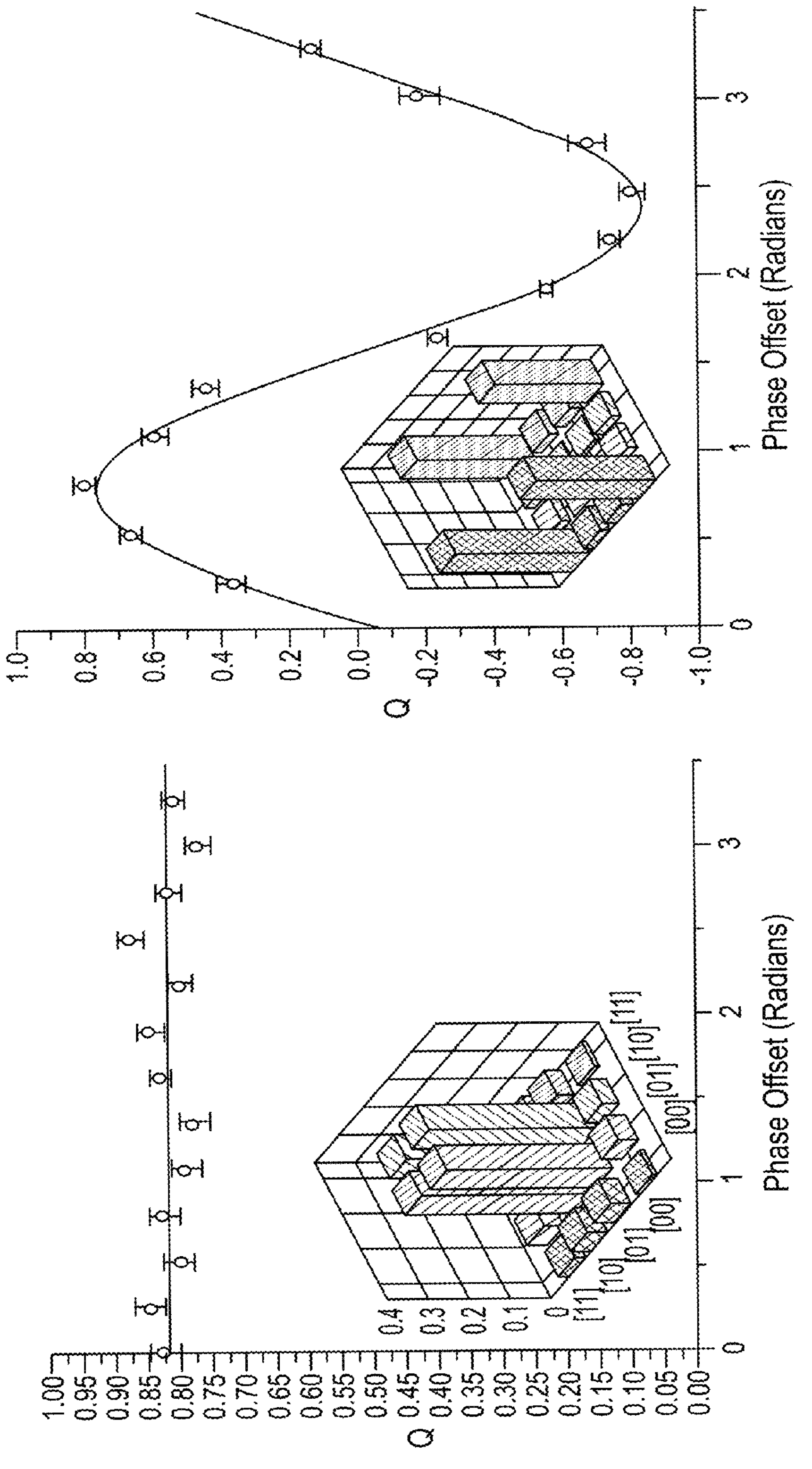

FIG. 6 provides two graphs of the two-atom coherence Q as a function of the phase offset (in radians) of a global π/2 pulse applied to two entangled qubits. A value Q=1 implies 100% entanglement. The left-hand graph is for qubits prepared in the Einstein-Podolsky-Rosen (EPR) state (or the two-atom W state) $(|01\rangle+|10\rangle)/\sqrt{2}$. The right-hand graph is for qubits prepared in the cat state, i.e. in the state $(|00\rangle+|11\rangle)/\sqrt{2}$. (As those skilled in the art will appreciate, both these entangled states are special cases of the Bell state.)

It will be seen that for qubits prepared in the cat state, Q is an oscillating function of the phase of the global π/2 pulse, with 100% entanglement at an oscillation amplitude of 1. It will be understood from the graphs that we achieved at least 80% entanglement fidelity for generating both the EPR state and the cat state with valid procedures, i.e., provided that the two atoms were still inside the traps after the entanglement procedure.

The inset superimposed on the left-hand graph is a density-matrix representation of the EPR state $(|01\rangle+|10\rangle)/\sqrt{2}$. The inset superimposed on the right-hand graph is a density-matrix representation of the cat state $(|00\rangle+|11\rangle)/\sqrt{2}$.

Our experiments show about 80% fidelity, or better, of generating EPR and cat state entanglements as long as the two atoms are still inside the traps after the entanglement procedure.

Figure 7B:
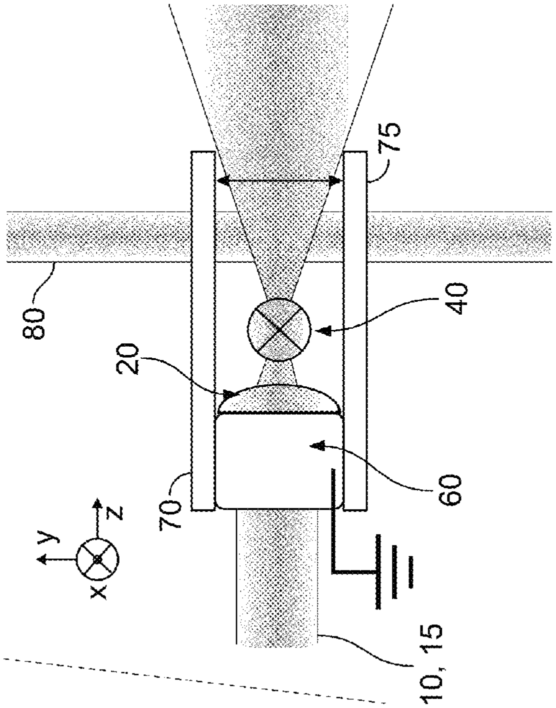
Figure 7A:
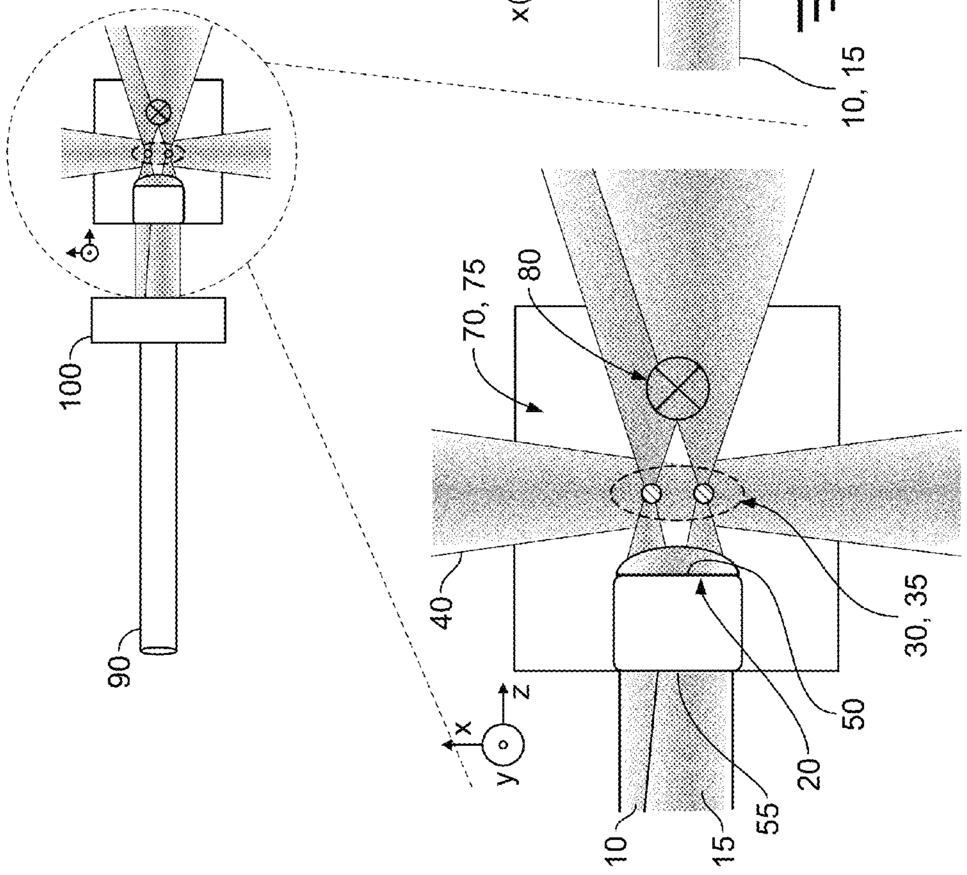

FIGS. 7A and 7B provide respective top (7A) and side (7B) views of the atom-trapping region in an example laboratory device for producing entangled atoms according to the principles described here.

Figure 8:
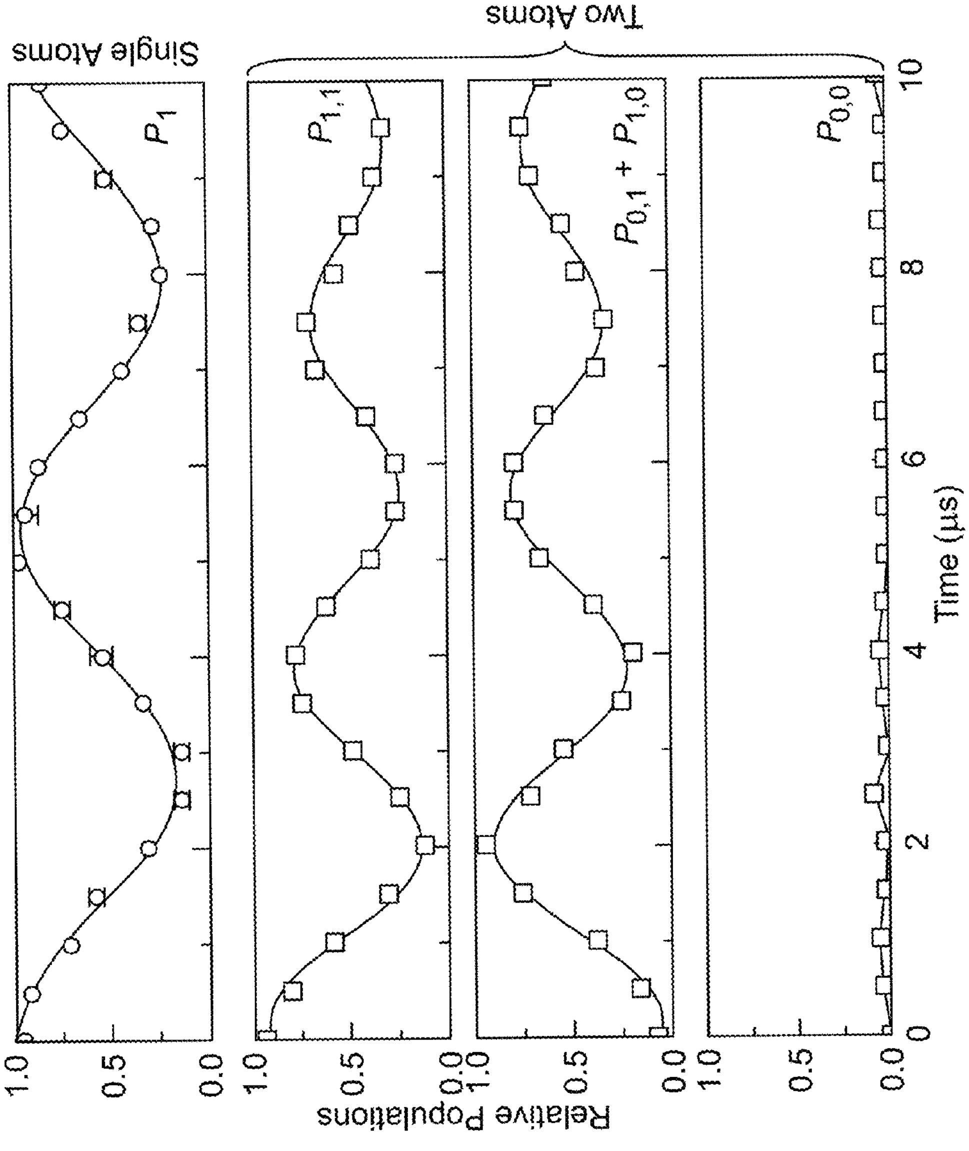

FIG. 8 provides an example of experimental data representing Rabi flopping in the presence of Rydberg dressing as described here. The top panel of the figure shows the Rabi oscillations of a single Rydberg-dressed cesium qubit. The lower three panels show two-atom data with Rydberg-dressed spin-flip blockade.

DETAILED DESCRIPTION

We now describe our new method for entangling neutral-atom qubits. An example is provided in which two neutral-atom qubits are entangled. However, the method is not limited to two-atom systems. Instead, extensions to systems of three or more atoms are also envisaged and should be understood as falling within the scope of the invention.

Each qubit is encoded in the hyperfine sublevels of the ground state of a neutral atom. In our experimental demonstrations, atoms of cesium-133 were used, and the present example will likewise be based on neutral cesium atoms. However, atoms of other elements, such as rubidium, may also be useful in this regard, hence the present example should not be regarded as limiting the scope of the invention.

The energy separation between the qubit states $|0\rangle$ and $|1\rangle$ due to hyperfine splitting in the isolated atoms corresponds to an optical frequency $\nu_{HF}$. A laser, referred to as the "Rydberg laser", applies an off-resonant Rydberg excitation to the atoms. If the two atoms were non-interacting, the Rydberg excitation would produce a "light shift", i.e. a shift in energy due to the AC Stark Effect, in one of the qubit states of each atom. However, if the atoms are sufficiently near each other, the EDDI prevents excitation of more than one atom to the Rydberg state; i.e., there is a Rydberg blockade. As a consequence, different multi-qubit states, e.g. different two-qubit states, can experience different light shifts.

The multi-qubit states experiencing a light shift from the Rydberg laser are referred to as "Rydberg-dressed" states because they always contain a certain amount (less than 50%) of a Rydberg state admixture.

Figure 1:
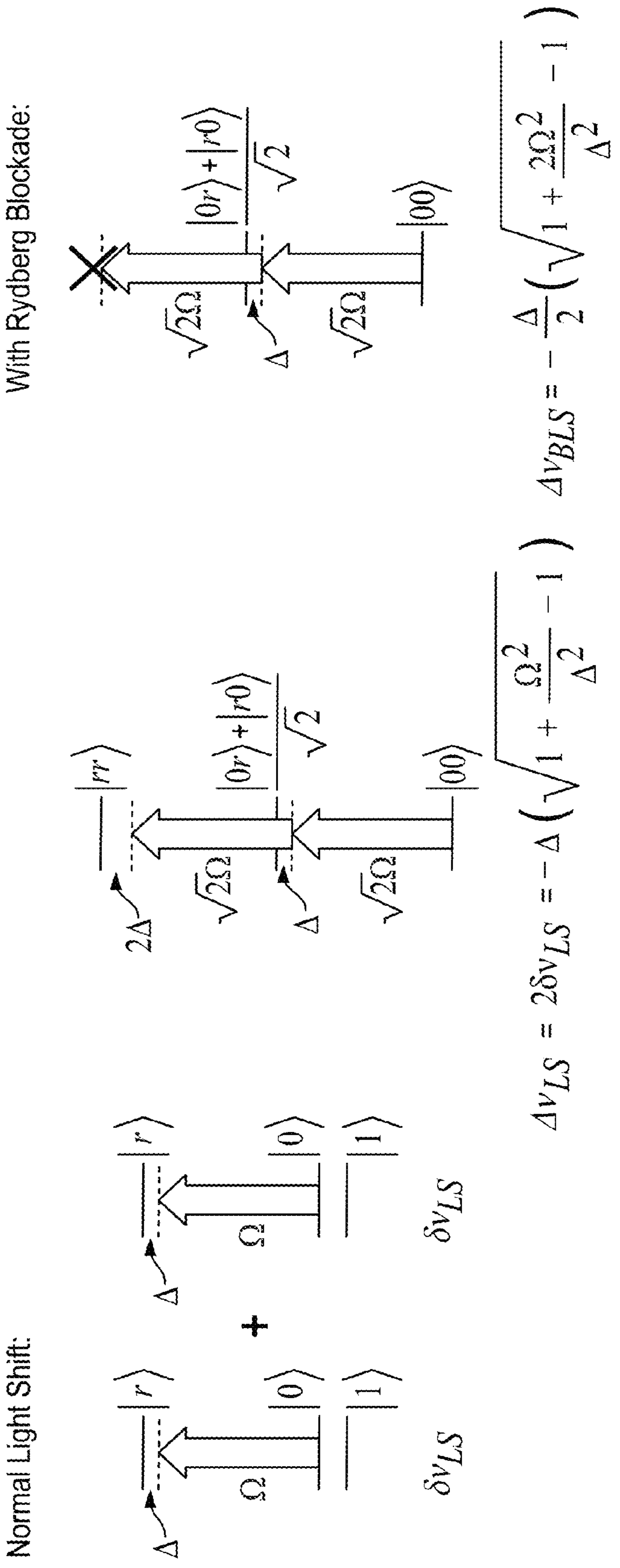
FIG. 1 is a notional atomic energy-level diagram illustrating the effect of Rydberg blockade. The left-hand side of the figure, titled "Normal light shift," illustrates that if the Rydberg-state interaction were neglected, the single-atom qubit state $|0\rangle$ would acquire a light shift $\delta\nu_{LS}$ due to the Rydberg excitation laser with an optical detuning Δ, and the two-qubit state $|00\rangle$ would acquire twice the single-atom light shift, i.e. it would acquire the two-atom light shift $$\Delta\nu_{LS} = 2\delta\nu_{LS} = -\Delta\left(\sqrt{1+\frac{\Omega^2}{\Delta^2}}-1\right).$$

Turning to FIG. 1, there will be seen an energy-level diagram in which the qubit states $|0\rangle$ and $|1\rangle$ are indicated together with a Rydberg state $|r\rangle$. For the single atom basis (i.e. for each individual atom, assuming no interaction between the two atoms), qubit state $|0\rangle$ is seen to acquire a light shift $\delta\nu_{LS}$ due to the Rydberg excitation laser with an optical detuning Δ. Qubit state $|1\rangle$ has no light shift because, due to the hyperfine splitting at frequency $\nu_{HF}$, its Rydberg resonance energy falls too far outside the linewidth of the Rydberg laser.

We now consider the two-qubit state. If there is no Rydberg blockade, then as shown in the middle portion of the figure, the light shift $\Delta\nu_{LS}$ on state $|00\rangle$ is simply twice the single-atom light shift, i.e. the two-atom light shift $\Delta\nu_{LS}$ equals $2\delta\nu_{LS}$. In terms of the Rydberg detuning $\Delta$ and the optical Rabi frequency $\Omega$ of the Rydberg laser (energy being expressed in equivalent frequency units), the two-atom light shift (absent EDDI) is expressed by $$\Delta\nu_{LS} = -\Delta\left(\sqrt{1+\frac{\Omega^2}{\Delta^2}}-1\right). \tag{4}$$

When the EDDI is introduced, however, the state $|rr\rangle$ is significantly shifted in energy or equivalently, it is blockaded as indicated in the right-hand portion of FIG. 1. As a consequence, the light shift on state $|00\rangle$ takes on a modified value that we represent by the symbol $\Delta\nu_{BLS}$. The degree of this modification is equivalent to the two-qubit interaction strength J, which exists only when both qubits are in state $|0\rangle$. That is, $$\Delta\nu_{BLS}-\Delta\nu_{LS}=J. \tag{5}$$

In terms of the Rydberg detuning $\Delta$ and the Rydberg laser Rabi frequency $\Omega$, the two-atom light shift (in the presence of EDDI) is expressed by $$\Delta\nu_{BLS} = -\frac{\Delta}{2}\left(\sqrt{1+\frac{2\Omega^2}{\Delta^2}}-1\right). \tag{6}$$

FIG. 2 provides an energy-level diagram illustrating the relative energy levels of the two-qubit states when there is Rydberg dressing. The energy levels are shown in the so-called "rotating" frame of reference in which the common frequency $\Delta\nu_{HF}$ is subtracted out, so that all energies are referred to the state $|11\rangle$ energy.

We will now discuss resonant transitions between energy levels in the two-qubit basis. Absent the Rydberg interaction, global qubit $\pi$ pulses can be applied at the (laboratory-frame) frequency $\nu_{HF}+\delta\nu_{LS}$ to transfer population between the various energy levels.

In this regard, a $\pi$ pulse is related to the so-called Rabi oscillations that occur when a two-level atomic population is subjected to a harmonic electromagnetic excitation near its resonant frequency. Under those conditions, the population oscillates between the two levels at a frequency referred to as the Rabi frequency. The Rabi frequency depends on, among other things, the detuning of the excitation from the resonant frequency and the electric field amplitude of the excitation. If, for example, a ground-state population is excited with a pulse whose duration is half the period of a Rabi oscillation, the ground-state population will be transferred to the excited state. Such a pulse is referred to as a "$\pi$ pulse". A pulse having half the duration of the $\pi$ pulse is referred to as a "$\pi/2$pulse".

Given the Rydberg interaction, however, the global qubit $\pi$ pulse at frequency $\nu_{HF}+\delta\nu_{LS}$ will no longer be effective to transfer population between $|00\rangle$ and $|11\rangle$ because $|00\rangle$ is shifted by the amount J. This has the important consequence that the transition frequency from the two-atom state $|11\rangle$ to $|01\rangle$, $|10\rangle$ is different from the transition frequency from $|01\rangle$, $|10\rangle$ to $|00\rangle$. This is what we have termed the Rydberg-dressed spin-flip blockade for qubit state transitions.

Referring back to FIG. 1, it will be seen that the transition from $|0>$ to $|r>$ is marked with the legend "$\Omega$", and the corresponding two-atom transitions are marked with the legend "$\sqrt{2}\cdot\Omega$". This signifies that there is an enhancement in the coupling amplitude of $\sqrt{2}$due to two-atom collective excitation, which occurs when two atoms are stimulated but the blockade prohibits more than one excited atomic state. The probability of each excitation is 50%. However, the amplitude of the coupling is $1/\sqrt{2}$ for each atom. When there are two atoms, the total coupling amplitude is $2*1/\sqrt{2}=\sqrt{2}$.

Significantly, the Rydberg-dressed blockade can be used to generate entanglement in the two-atom ground-state basis state because it provides a physical basis for quantum logic, i.e., a state-dependent interaction between two qubits. This is a departure from earlier-demonstrated approaches that rely on full and coherent excitation of population into the Rydberg state manifold. Our approach is advantageous because, among other things, it eliminates key decoherence mechanisms and simplifies the laser system.

To generate entanglement using our approach, we can initially prepare two qubits into a separable state $|11\rangle=|1\rangle\otimes|1\rangle$, and then apply a $\pi$ pulse to transfer the state into an entangled Bell state of the kind $(|01\rangle+|10\rangle)/\sqrt{2}$. Provided the inverse of the Tr pulse time is much smaller than J, this Einstein-Podolsky-Rosen (EPR)-type entanglement can be produced with high fidelity by simply applying a single-qubit $\pi$ pulse. (The condition that the inverse of the $\pi$ pulse time must be much smaller than J can be restated as a requirement that the equivalent microwave bandwidth due to the two-photon stimulated Raman transition between the $|0\rangle$ and $|1\rangle$ qubit states must be much smaller than J. This use of stimulated Raman scattering is explained below.)

If desired, a so-called "cat" state, $(|00\rangle+|11\rangle)/\sqrt{2}$, can be generated from the EPR state by applying a $\pi/2$ pulse after turning off the Rydberg dressing laser. Alternatively, while the Rydberg dressing laser is still on, a two-photon, anti-blockade transition from $|11\rangle$ to $|00\rangle$ can also be used to generate a cat state. In an "anti-blockade" excitation, the Raman frequency is adjusted to overcome the blockading energy shift.

Such pairwise entanglement is the essential mechanism for a quantum computing circuit with multiple qubits. For applications in quantum metrology, it would be necessary to provide a large-scale entanglement. Large-scale entanglement could possibly be achieved, for example, by starting from pairwise entanglement and proceeding stepwise to all-qubit entanglement. In an illustrative stepwise procedure, qubits 1 and 2 are entangled, then qubits 2 and 3 are entangled, etc.

An alternative approach is to take advantage of different transition frequencies between the multi-qubit states while Rydberg dressing is on. Accordingly, the operator could select an appropriate transition and excite it such that the qubit ensemble evolves into the desired entanglement via single-step multiple particle entanglement. In principle, different n-qubit entangled states, such as W state, GHZ state, or spin-squeezed state could be produced this way.

In an example that we have verified experimentally, two-qubit entanglement is created using two single cesium atoms. The apparatus is described in detail in A.M. Hankin, et al., "Two-atom Rydberg blockade using direct 6S to nP excitation", *Phys. Rev. A,* 89, 033416 (2014), the entirety of which is hereby incorporated herein by reference. Further details of the experiments reported here are published in Y.-Y. Jau et al., "Entangling Atomic Spins with a Rydberg-Dressed Spin-Flip Blockade," *Nature Physics*, doi: 10.1038/nphys3487, published online Oct. 5, 2015, the entirety of which is hereby incorporated herein by reference.

A brief summary of the apparatus reported in Hankin will be provided below.

In our example, the qubit states |0⟩ and |1⟩ are respectively encoded as the |F=4, m=0⟩ and |F=3, m=0⟩ cesium hyperfine sublevels. Initially, optical tweezers are used to optically trap two neutral cesium atoms. It is well known in the art that small dielectric particles, even particles as small as single atoms, can be trapped by the electric field gradient in a highly focused laser beam. It is also well known that the trap position can be shifted by deflecting the trapping laser beam with an acousto-optic modulator (AOM). The deflection angle depends on the applied modulation frequency that drives the AOM.

In our implementation, two optical tweezers are created from a single laser beam by driving the AOM at two frequencies. More specifically, a laser beam to be used for trapping is transmitted through the AOM. The AOM is modulated at two independently variable drive frequencies. Modulation at two different frequencies produces two outgoing atom-trap laser beams. The two outgoing trap beams pass through a lens that focuses the beams in respective spots on the focal plane. The two focused spots are the optical traps. The trap-to-trap separation is proportional to the difference between the respective deflection angles of the trap beams that are outgoing from the AOM.

By independently sweeping the two drive frequencies, we are able to move the two traps dynamically. This is highly advantageous because the Rydberg interaction energy J must be relatively large in order for Rydberg-dressed blockade to occur. Our dynamic technique permits us to place the atoms close together to obtain the required strong Rydberg interactions, and then to shift the atoms to a relatively large separation distance to obtain good signal detection.

The key mechanism that determines the interaction strength J depends on the EDDI and the Rydberg-Rabi frequency $\Omega_L$. Consequently, it is crucial to control the separation between the Rydberg-dressed atoms and to control the principal quantum number of the Rydberg atom. As noted, the atoms are ideally separated by a great distance for individual addressing, but are placed in close proximity to maximize J. To achieve this, we use the AOM to create two optical tweezers, each of which traps a respective one of the two atoms, from a single laser beam. This is done by independently sweeping the values of the two AOM drive frequencies to dynamically translate the traps.

The capability of maximizing J at shorter interatomic distance allows us to reduce the principal quantum number of the Rydberg level. Thus, the oscillator strength for direct excitation is improved, which allows us to maximize $\Omega_L$ for a given Rydberg laser intensity. This has the added benefit of reducing environmental interaction, which rapidly increases in severity for higher-lying Rydberg levels.

It is instructive in this regard to refer to FIG. 3, which illustrates how J depends on the interatomic distance. The continuous curve drawn in the figure represents the calculated value of J (in energy-equivalent frequency units), and the discrete points (with error bars indicated) represent experimental data. In the experiments that produced those data, the Rydberg laser power and tuning were adjusted to provide a Rydberg-Rabi frequency $\Omega_L/2\pi$ of 4.3 MHz and a detuning $\Delta_L/2\pi$ of 1.3 MHz. It will be appreciated from the figure that short interatomic separation is the key condition for obtaining large absolute values of J.

We will now briefly describe our experimental sequence for generating two-qubit entanglement. Reference is made in the following discussion to FIG. 4, to which attention is directed.

Initially, the cesium atoms are loaded into the optical traps from a magneto-optical trap (MOT). MOTs are well known in the art and need not be described here in detail.

Occupancy of the traps by trapped atoms is confirmed by using avalanche photodiodes (APDs), optically coupled to the traps by optical fibers, to detect atomic fluorescence due to the well-known $|6S_{1/2}$, F=4>→$|6P_{3/2}$, F'=5⟩ D2 cycling transition. This technique is also useful for independent state detection, because single-atom state |0> is bright to this excitation, whereas single-atom state |1> is dark to it.

After loading the traps, we use laser pumping to optically prepare each qubit in state |1⟩ . This is done at a relatively large separation of 6.6 μm, so that the two atoms are effectively non-interacting.

We then employ optical tweezers, i.e. the dynamic technique discussed above, to bring the two atoms into much closer proximity. In this step, the two trapped atoms are translated toward each other with an average speed of 9 mm/s (by advancing by an 18-nm step every 2 μs) by ramping the modulation frequencies of the AOM.

When the atoms reach the target separation distance, we release the atoms by turning off the trap beams, thereby turning off the optical trapping potentials. This latter step removes the energy-level-shifting action of the optical tweezers.

At the target separation, a Rydberg dressing laser beam is impinged on both atoms in concert with a stimulated Raman π pulse.

For Rydberg dressing, we use a 319-nm laser to couple the atoms directly from the ground state to the Rydberg level in a single photon transition, $|6S_{1/2}$, F=4>→$64P_{3/2}$. This avoids the disadvantages of the typical two-photon Rydberg excitation method, which promotes unwanted population into an intermediate, short-lived excited state that contributes to ground-state decoherence. The choice of the n=64 Rydberg level is a non-limiting example. Although under the particular circumstances of our experiments, n=64 gave the best entanglement result, any Rydberg state can be used for Rydberg dressing, including states as low as n=30 and even as low as 20, ranging to states as high as n=92 and above.

We choose a detuning that is small compared to the ground-state hyperfine splitting of 9.2 GHz so that the dressing of |1, 1> in the F=3 manifold is negligible, but all other ground states in the logical basis {|0, 0>, |0, 1>, |1, 0>} are now well-described in the dressed basis.

It should be noted in this regard that the EDDI causes a negative (i.e. "red") shift in the $64P_{3/2}$ Rydberg level. Hence our detuning is in the opposite direction; that is, we tune the 319-nm Rydberg laser to higher energy (i.e. we shift it "blue").

The Raman pulse is tuned to excite the transition between the |0⟩ and |1⟩ qubit states (which is at 9.2 GHz for the isolated atoms). Because of the blockade effect due to the Rydberg dressing laser, the combined excitation drives the spin-state population primarily from |11⟩ =|1⟩ ⊗|1⟩ into the entangled Bell state (|01⟩ +|10⟩ )/√2.

The optical trapping potentials are then restored to recapture the (now EPR-entangled) atoms. The optical tweezers are then used to translate the entangled atoms back to their original positions, where state detection can be performed.

The use of stimulated Raman transitions is well-known in the spectroscopic arts and need not be described here in detail. We note briefly that stimulated Raman scattering (SRS) is commonly used to indirectly excite an internal transition in atoms or molecules when a direct excitation source is unavailable. Typically, a transition between states $|A\rangle$ and $|B\rangle$ is produced via two optical transitions, one connecting states $|A\rangle$ and $|C\rangle$ and the other connecting states $|B\rangle$ and $|C\rangle$, state $|C\rangle$ being a shared state for the two optical transitions. In our arrangement, a single Raman laser beam is modulated to produce two frequency components within the same beam. The Raman beam is aligned so that it will interact with the trapped atoms. Via SRS, the two frequency components in the beam excite the microwave transition between the $|0\rangle$ and $|1\rangle$ qubit states. Because the laser beam can be focused to a very small spot, it advantageously makes possible a highly localized and strong transition.

As noted above, to verify that the atoms are entangled, we re-separate the atoms and then perform a state detection to determine whether each atom is in state $|0\rangle$ or $|1\rangle$. If the atoms are entangled, the individual outcomes will be correlated, such that if measurements show that one atom is in state $|0\rangle$, they must show that the other atom is in state $|1\rangle$, and vice versa.

Following this, we check whether the two atoms are still inside the traps. If the two atoms are still confined within the traps, we count the foregoing procedure as a valid operation. It is possible that atoms may sometimes fail to be detected within the traps after the procedure. This is due to the slightly imperfect recapture probability and to a finite probability of excitation to the Rydberg state. As long as the atom is in the Rydberg state before it leaves the trap center, it cannot be recaptured. This constitutes a loss channel for the operation.

FIG. 5 displays typical experimental data showing Rabi oscillations ("Rabi flopping") in the presence of Rydberg-dressed blockade. A qubit rotating field (i.e., an SRS excitation) is applied to the two qubits. Each data point is the average of several hundred measurements similar to what we have described above, but taken at various durations of the Raman pulse.

The upper portion of the figure is a composite plot of state probability versus Raman pulse duration. Four separate plots are provided, corresponding to the respective two-qubit states $|11\rangle$ (uppermost plot), $|10\rangle$ (second from uppermost plot), $|01\rangle$ (third from uppermost plot), and $|00\rangle$ (bottom plot). As seen in the figure, an oscillation occurs between $|11\rangle$ and ($|01\rangle$, $|10\rangle$) with a very small probability of exciting to $|00\rangle$. The optimal π-pulse duration for generating the EPR state is seen in the figure to be about 2 μs.

By running a detailed computer simulation matching the data, we were able to show, using a density matrix representation, how the system evolves into an EPR-type Bell state. The evolution of the density matrix is shown in the bottom portion of the figure.

The density matrix is defined by:

$$d_{ij}=\Sigma_p\langle i|p\rangle\langle p|j\rangle \Pr\{p\}, \quad (7)$$

where in our case the states $|i\rangle$ and $|j\rangle$ are $|11\rangle$, $|10\rangle$, $|01\rangle$, and $|00\rangle$, and $\Pr\{p\}$ is the probability of state $|p\rangle$. In particular, it will be understood that when the probability of $|11\rangle$ is 100%, the only non-zero entry is $d_{11,11}$, and when the probability of the Bell state $(|01\rangle+|10\rangle)/\sqrt{2}$ is 100%, the only non-zero entries are $d_{10,10}$, $d_{10,01}$, $d_{01,01}$, and $d_{01,10}$, all four of which have equal values, with amplitudes of 0.5. Likewise, when the probability of the cat state $(|00\rangle+|11\rangle)/\sqrt{2}$ is 100%, the only non-zero entries are $d_{00,00}$, $d_{00,11}$, $d_{11,11}$, and $d_{11,00}$, all four of which have equal values, with amplitudes of 0.5.

A robust way to verify the degree of entanglement is to measure the magnitude Q of the two-atom coherence by applying global π/2 pulses with different phases to the two entangled qubits. Q is defined by $Q=P_{11}+P_{00}-(P_{01}+P_{10})$, where $P_{xx}$ denotes the probability in state $|xx\rangle$. The coherence is related to the fidelity of the system such that Q is a lower bound on the fidelity. For Q=1, both the two-atom coherence and the fidelity are 100%. For Q=0, the fidelity will have a value between 0 and 0.5, the actual value depending on the actual atomic state population.

For qubits prepared in the EPR state, Q is a positive value independent of the phase of the global π/2 pulse. As noted, we would have 100% entanglement for Q=1. For qubits prepared in the cat state, Q is an oscillating function of the phase of the global π/2 pulse. In this case, 100% entanglement happens at the oscillation amplitude=1.

FIG. 6 shows that we have achieved at least 80% entanglement fidelity for generating both the EPR state and the cat state with a valid procedure (i.e., with two atoms still obtaining in the trap at the end of the procedure). Considering that the two-atom survival probability after the procedure is about 75% it follows that the success rate of deterministically generating an entangled qubit pair is about 60%.

With our current experimental data rate (about 10 $s^{-1}$), on average we can generate six pairs of entangled qubits per second. The current limiting factors for entanglement fidelity from a valid procedure are the optical pumping efficiency (about 95% maximum), decay of the Rabi oscillation (as shown, e.g., in FIG. 4), and the strength J of the Rydberg interaction. Optical pumping efficiency determines how well we can prepare the atoms into the initial qubit states, which can be improved with a more careful pumping scheme.

As those skilled in the art will recognize, the set of actual hyperfine levels that we use to define a qubit are referred to as the "computation space". Thus in the present example, the computation space consists of two of the sixteen cesium ground-state hyperfine sublevels, specifically, the clock states of the cesium $6S_{1/2}$ ground-state manifold.

It should be noted in this regard that our current state-preparation technique will occasionally prepare an atom into the wrong sublevels which are outside the computation space.

Decay of the Rabi oscillation tends to reduce the fidelity of the π pulse. The major cause of the decay is probably photon scattering via the Rydberg excitation laser, although there are also effects of other dephasing mechanisms that are not yet well understood.

The photon scattering rate is inversely proportional to the Rydberg state lifetime. Our current Rydberg state lifetime is much shorter than the natural lifetime. We believe that this lifetime can be extended by identifying and reducing or eliminating various lifetime-reducing factors.

The interaction strength J can be increased by increasing the intensity of the Rydberg-dressing laser or by dressing with a Rydberg state that has a larger coupling strength.

As noted, our experimental apparatus is similar to that described in A. M. Hankin et al., "Two-atom Rydberg blockade using direct 6S to nP excitation," *Phys. Rev. A* 89 (2014) 033416.1-033416.9. It should be understood, however, that the purpose of the Hankin paper was to report on direct Rydberg excitation and Rydberg blockade. That work did not utilize hyperfine transitions as described here, and it did not involve Rydberg dressing and entanglement as also described here.

FIGS. 7A and 7B respectively provide top and side views of our ultra-high vacuum cell, including the atom-trapping region of our experimental apparatus. Features common to both figures are designated by like reference numerals, although some reference numerals may be included only in one figure or the other.

As seen in the figures, two collimated 938-nm dipole trap beams 10, 15 are provided. The optical power is nominally 8 mW, with a variation of 20-30%. In the coordinate system illustrated in insets to the figures, the trap beams diverge along the z-axis after passing the focal spot, which is the atom trapping point. The diverging trap beams pass through an aspheric lens 20, focal length 2.76-mm, which focusses the trap beams to produce two traps 30, 35 separated by 6.6(3) μm at the focal plane.

Each trap is formed by a tightly focused spot that has a $1/e^2$ waist radius of 1.29(3) μm. There is a 21.1(1)-MHz trap depth for the atomic ground state. Once trapped, the atoms have a vacuum-limited trap lifetime of approximately 7 s.

A 319-nm Rydberg laser beam 40, for exciting the Rydberg transition, is incident on the traps in a direction parallel to the x-axis as shown in the figures. The Rydberg beam is focused down to a 12.9(4)-μm waist at the locations of the trapped atoms.

The aspheric lens has a 112-nm indium tin oxide (ITO) coating on the side 50 facing the dipole traps and an antireflection (AR) coating for 852 nm on the opposite side 55. A cylindrical aluminum lens mount 60 is fixed concentric to the AR-coated side to shield against electrostatic charging.

Two cesium-133 atoms are trapped 2.16 mm from the lens surface. At this proximity, background electric fields can perturb the Rydberg state, thus interfering with its coherent control. The ITO coating on lens 20 is part of a scheme, including a partial Faraday cage, for suppressing the undesired electric fields. The ITO coating, which is an optically transparent electrical conductor, is grounded to dissipate charging.

To further protect against the influence of external electric fields, the trapping region is surrounded with a partial Faraday cage in vacuum by mounting lens 20 between two parallel glass plates 70, 75 that are also coated with ITO and that are assembled using a vacuum-compatible conductive epoxy adhesive. The entire assembly is grounded. A 636-nm charging laser beam 80 can be used to controllably charge the ITO plates, which offers further control over the background electric field environment. We estimated from an electrostatic finite element analysis that this scheme could suppress electric fields external to the system by a factor of 1000.

The trap beams 10, 15 originate as single 938-nm laser beam 90 emitted from a distributed feedback laser diode (not shown in the figures). Spectral components at 852 nm and 895 nm are removed from beam 90 by optical filtering. This is advisable because these spectral components correspond to the D2 and D1 transitions in cesium-133 and if absorbed, they can cause excessive heating that makes the trapping less stable. Before entering lens 20, beam 90 passes through an acousto-optic modulator (AOM) 100. To generate the two diverging trap beams, we drive the AOM at two independently controlled driving frequencies. The two frequencies are nominally 74.6 MHz and 85.4 MHz.

As noted, the atoms are loaded into the dipole traps from a magnetooptical trap (MOT). The dissipative scattering force generated by the MOT cools atoms into the conservative pseudopotential of the dipole traps. As also noted, fluorescence of the trapped atoms on the cesium-133 D2 transition ($6S_{1/2} \rightarrow 6P_{3/2}$) provides a signal that can be spatially discriminated to detect loading events.

The MOT cloud density is adjusted such that the dipole traps will operate in the collisional blockade regime. This limits the loading to a maximum of one atom. Coincident fluorescence signals are an indication that both dipole traps are loaded simultaneously. After the MOT is switched off, there is a 10-ms wait period to allow the magnetic field environment to stabilize and the MOT cloud to dissipate. Then the trapped atoms are prepared in their initial state for entanglement.

As explained above, an off-resonant Rydberg laser can be used to induce a state characterized by a partial admixture of a Rydberg atomic level. In alternative approaches, an on-resonant Rydberg laser can be used. An on-resonant beam would typically create a strong admixture, for example up to 50%. However, a technique referred to as "adiabatic ramping" can be used to avoid potential ill effects of the strong admixture. In adiabatic ramping, the Rydberg laser is turned on and off gradually. The beam is initially turned on at zero intensity and far detuning, and is gradually brought to the targeted intensity and resonant wavelength. Likewise, to turn the beam off, it is gradually detuned and reduced in intensity.

Other alternative approaches relate to the modulator used to manipulate the optical traps. One alternative type of modulator potentially useful in this regard is a spatial light modulator (SLM). An SLM uses independent control of individual, high-resolution pixels to adjust optical phases and intensities. In principle, arbitrary patterns of multiple focused spots can be generated by an SLM. This leads to great potential for the creation and manipulation of optical traps.

Example

Apparatus as described above was used.

By polarization gradient cooling, the atom temperature was reduced to about 20 μK. A bias field at 4.8 G was then turned on to define a quantization axis, and we optically pumped the atoms into the state $|6S_{1/2}, F=4, m_F=0>$, i.e. our logical basis state $|0>$, using a π-polarized laser at 895 nm tuned to the $|6S_{1/2}, F=4> \rightarrow |6P_{1/2}, F=4>$ transition and a repump laser at 852 nm tuned to the $|6S_{1/2}, F=3\rangle \rightarrow |6P_{3/2}, F=4\rangle$ transition. The state preparation efficiency was about 95%, limited by the stray, fictitious magnetic field produced by vector light shifts from the dipole-trap laser.

We applied a two-photon Raman laser field to perform a global π rotation to bring the atoms from $|0, 0\rangle$ to $|1, 1\rangle$. The stimulated Raman transition uses the carrier and one sideband from a laser tuned 50-GHz red of the cesium-133 D2 line ($6S_{1/2} \rightarrow 6P_{3/2}$) and modulated via a fiber-based EOM.

To Rydberg-dress the atoms with a strong EDDI, we dynamically translated the two cesium atoms into close proximity to a targeted distance R by ramping the AOM modulation frequencies as explained above. From the initial separation of 6.6 μm, we could continuously vary R down to a minimum value of 1.5 μm, at which point the two traps began to merge, causing atom loss.

During the Rydberg dressing period, we turned off the traps to eliminate the light shift due to the trap laser. Afterward, we restored the traps to recapture the falling atoms. We used a Rydberg dressing laser at 319 nm to drive direct, single-photon transitions from $6S_{1/2}$ to $nP_{3/2}$. The Rydberg excitation laser was designed to cover the principal quantum numbers ranging from n=30 to ionization. We detuned the Rydberg excitation laser toward higher energy to avoid the EDDI-induced red shift of the two-atom Rydberg state, as explained above. With a strong bias magnetic field, we used the Rydberg state $nP_{3/2}$ with magnetic sublevel $m_J$=3/2 for dressing the qubit state |0〉.

For state detection, we translated the two trapped cesium atoms back to their original positions. The state-dependent detection was accomplished using the $|6S_{1/2}$, F=4〉→$|6P_{3/2}$, F'=5〉 D2 cycling transition to determine whether each atom was in state |0〉 (bright to this excitation) or state |1〉 (dark to this excitation). In the case that the atom was found to be dark, we immediately applied the repump laser simultaneously with the cycling laser to check that the atom was indeed in state |1〉 by verifying its presence in the trap. It should be noted in this regard that the detection method identifies the entire $|6S_{1/2}$, F=4〉 manifold with |0〉 and the entire $|6S_{1/2}$, F=3〉 manifold with |1〉. Our detection method is non-destructive, hence it allows us to reuse atoms without reloading new atoms from the MOT. This beneficially increased our data rate from about 1 $s^{-1}$ to about 10 $s^{-1}$.

In our experiment, we chose two example conditions: $\Omega_L/2\pi$=4.4 MHz, $\Delta_L/2\pi$=4 MHz; and $\Omega_L/2\pi$=4.3 MHz, $\Delta_L/2\pi$=1.3 MHz. This produced respective dressed states of 0.41|r〉+0.91|0〉 (giving an 84% probability of being in |0>) and 0.6|r〉+0.8|0〉 (giving a 64% probability of being in |0>). In the experiment, we did not adiabatically transfer the dressed state back to the bare ground state. This had the consequence of reducing the atom-recapture probability.

It should be noted that when there is a probability that the atom is excited to the Rydberg state, there is also a probability that the atom will not be recaptured in the trap during the time window (about 10 μs) of efficient recapture. In the detection, we only counted the data with atoms that remained trapped.

FIG. 8 illustrates a straightforward method for generating the Bell state (|0, 1>+|1, 0>)/√2. The figure displays typical experimental data representing Rabi flopping in the presence of Rydberg dressing with the parameters n=64,$\Omega_L/2\pi$=4.3 MHz, $\Delta_L/2\pi$=1.1 MHz, R=2.9 μm, and J/h≈750 kHz. Each data point is the average of several hundred measurements but with various Raman pulse durations.

The top panel of the figure shows the Rabi oscillations of a single Rydberg-dressed cesium qubit. The lower three panels show two-atom data with the Rydberg-dressed blockade. The data points are fitted with curves of damped oscillation and exponentially varied offset. Rabi oscillation is seen to occur between |1, 1> and the two-qubit entangled state (|0, 1>+|1, 0>)/√2. An enhancement by √2 is seen in the Raman-Rabi rate that arises from the blockade. Excitation to the state |0, 0〉 is seen to be strongly suppressed due to the transition blockade. The error bars for all data points correspond to one standard deviation.

With a strong J, microwave excitation to the state |0, 0〉 is blockaded. The microwave Rabi oscillation can occur only between |1, 1〉 and (|0,1〉+|1, 0〉)/√2, with a very small probability exciting to |0, 0〉. We also observed enhancement by a factor of √2 in the microwave Rabi rate relative to the single-atom Rabi rate. This is secondary evidence of entanglement. As noted above, the optimal π time for generating the abovesaid Bell state was about 2 μs. To produce the Bell state (|0, 0〉+|1, 1〉)/√2, we simply applied a global π/2 pulse to the state (|0, 1〉+|1, 0〉)/√2.

The best entanglement fidelity that we obtained by fine tuning the experimental parameters was at least 81(2)% excluding the atom loss events, and at least 60(3)% when loss was included.

What is claimed is:

1. A method for preparing an entangled quantum state of an atomic ensemble that consists of two or more identical atoms, comprising:

loading each atom of the atomic ensemble into a respective optical trap;

placing each atom of the atomic ensemble into a same first atomic quantum state by impingement of pump radiation;

approaching the atoms of the atomic ensemble to within a dipole-dipole interaction length of each other;

in a Rydberg-dressing operation, impinging a Rydberg-dressing laser beam on the atomic ensemble;

during the Rydberg-dressing operation, exciting the atomic ensemble with a Raman pulse; and separating the atoms of the atomic ensemble by more than a dipole-dipole interaction length;

wherein:

the Rydberg-dressing operation has a specified transition from an atomic ground state to a target Rydberg-atom principal quantum number, and the Rydberg-dressing laser beam only partially stimulates the specified transition; and the Raman pulse is tuned to stimulate a ground-state hyperfine transition from the first atomic quantum state to a second atomic quantum state.

2. The method of claim 1, wherein the Rydberg-dressing laser beam is detuned so as to only partially stimulate the specified transition.

3. The method of claim 1, wherein the Rydberg-dressing laser beam is adiabatically ramped so as to only partially stimulate the specified transition.

4. The method of claim 1, wherein: the optical trap for each respective atom of the atomic ensemble is provided by a trapping laser beam deflected by a modulator.

5. The method of claim 4, wherein the modulator is an acousto-optic modulator (AOM), the AOM is driven by a respective, independently controllable drive signal for each of the optical traps; and the approaching and separating steps are performed by sweeping the respective AOM drive signals.

6. The method of claim 4, wherein the modulator is a spatial light modulator.

7. The method of claim 1, wherein the atomic ensemble consists of cesium-133 atoms.

8. The method of claim 1, wherein the target Rydberg-atom principal quantum number is at least 20.

9. The method of claim 1, wherein the target Rydberg-atom principal quantum number is 64.

10. The method of claim 1, wherein the atomic ensemble consists of two atoms.

* * * * *